United States Patent Office 3,238,470
Patented Mar. 1, 1966

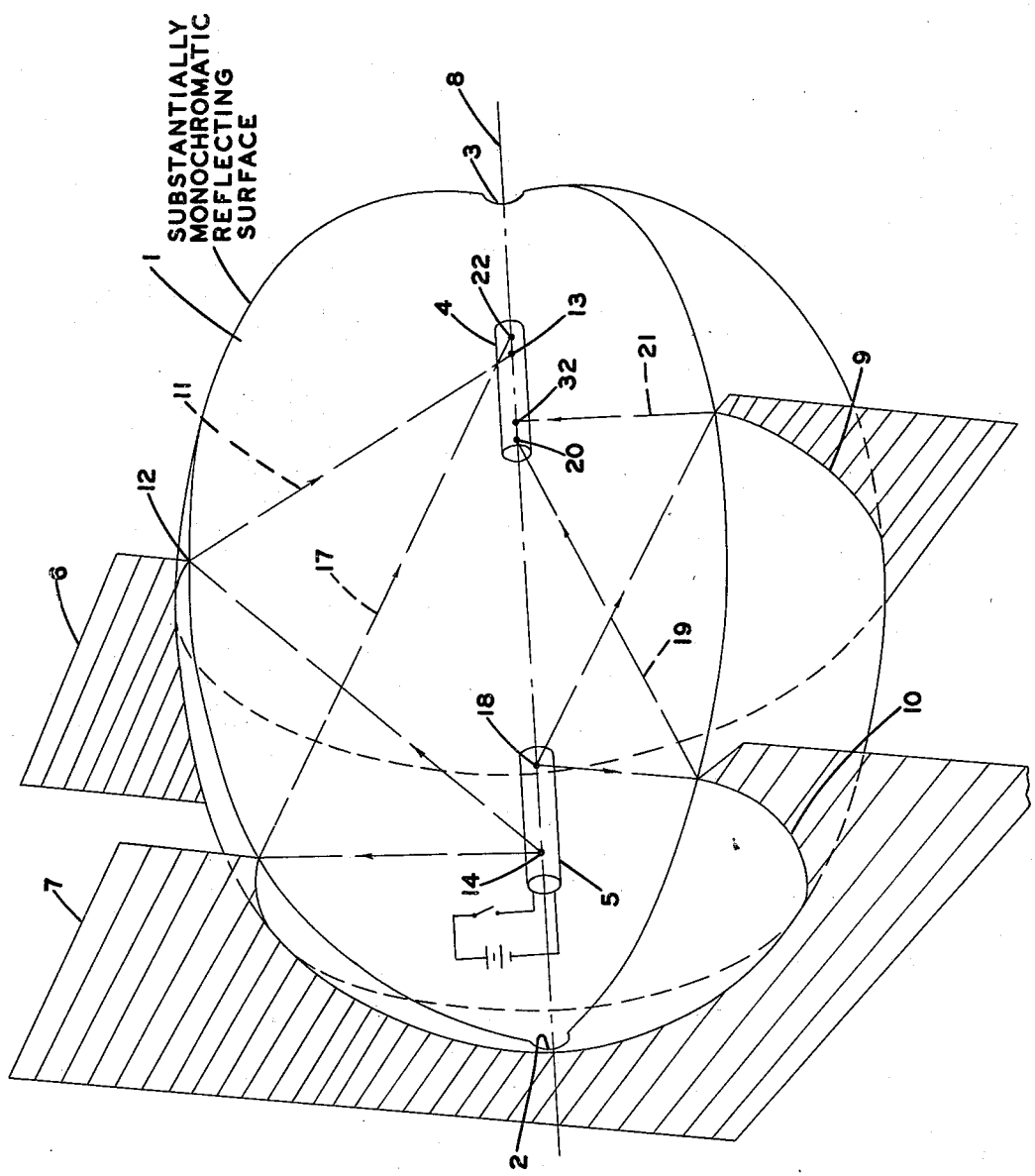

3,238,470
LASER PUMPING USING AN ELLIPSOID REFLECTOR
Charles F. Mooney, Irondequoit, N.Y., assignor to Bausch & Lomb Incorporated, Rochester, N.Y., a corporation of New York
Filed Apr. 5, 1962, Ser. No. 185,342
7 Claims. (Cl. 331—94.5)

This invention relates to an energizing means and more specifically to a reflector of revolution reflecting radiation for energization of an optical resonating element, hereinafter called a laser.

The laser is designed to produce light which is radiated as an intense coherent collimated monochromatic beam. The laser is energized by an excitation light source, normally a tube of high pressure vapor through which a bank of electrical condensers are discharged. The light from the laser is of considerably greater intensity than the pumping light source because it is emitted coherently and monochromatically. The laser stores the light energy briefly then releases it in an even briefer interval of time. A major problem in operation of a laser is to elevate the potential energy of the majority of the electrons in the laser. This requires a copious radiant energy transfer between the excitation source and the laser material. Present transfer arrangements are less than one percent efficient.

Accordingly, this invention is intended to provide a reflector defining an oval of revolution reflecting incident light from a source of radiation and directing the light into a laser to raise the energy state to the desired level for operation of the laser.

It is an object of this invention to provide a means for directing a radiant flux from a radiant source into a laser.

It is another object of this invention to provide a reflector defining an ellipsoid of revolution for reflecting a radiant flux originating on the major axis and including the one focal point of the ellipsoid of revolution and reflecting the radiant flux to the laser including the other focal point on the major axis of the ellipsoid of revolution.

It is a further object of this invention to provide a reflector defining an oval reflector containing a cylindrical radiant source lying on or near the major axis and reflecting a radiant flux to a cylindrical laser also lying on or near the major axis.

The objects of this invention are accomplished by placing a substantially cylindrical radiation source on or near the major axis of a prolate oval of revolution including as special cases prolate ellipsoids of revolution, and by placing the laser on or near the major axis in an optically conjugate position. A reflector reflects the radiant flux radiated by the radiant source to the laser thereby energizing the laser. The reflector provides an efficient means of directing light from the radiant source to the laser.

The drawings illustrate the preferred embodiment of this invention. Reference may be had to the drawings for illustration of this invention in which;

The drawing illustrates a single view of an oval reflector and the rays directed from the source of radiation to the laser.

Referring to the drawings, the reflector 1 defines an oval of revolution having its internal surface coated with a suitable material which reflects light incident on its inner surface. The reflector 1 has openings 2 and 3 in its two ends. The opening 3 is intended to be used primarily for permitting the burst of light from the laser 4 to escape from the reflector 1.

The physical law of reflection requires that a ray reflected at a point or small area of a mirror remain in the plane defined by the intersection of the ray and the perpendicular to the reflecting surface at the point of reflection. The perpendicular to the plane tangent to any point on a reflector which has an axis of revolution intersects the axis of revolution. If the source lies on the axis of revolution, the plane of incidence of any ray from the source contains the axis of revolution. A broad group of hollow ovoid reflecting surfaces of revolution exist such that light from some appreciable length interval along the axis of revolution will be reflected by the surface back toward the axis. Such light will by the law of reflection pass through the axis of revolution after reflection. Similarly light originating near but not precisely on the axis will pass near but not exactly on the axis after reflection. The selection of an interval of length along the axis as a location for the source is made so that the light is concentrated after reflection in a non-overlapping interval of length along the axis of revolution. This is the position at which the laser is located. This position is optically conjugate to the source position.

For the purpose of illustration the oval of revolution has been broken away to show the positions of the related parts within the reflector. Diagrammatic rays of light radiating from the radiant source 5 are drawn to show the means of transfer of radiant energy from the source 5 to the laser 4. Two arbitrary planes of intersection 6 and 7 intersect the reflector 1 at parallel planes normal to the major axis 8 of the oval of revolution. The intersection of the planes 6 and 7 with the reflector are circles 9 and 10.

The source of radiation 5 radiates a flux which is reflected on the inner surface of the reflector 1. The flux is reflected by all portions of the inner surface of the reflector, however, for purposes of illustration only the rays reflected at the arbitrary plane of intersection of planes 6 and 7 will be discussed. The ray 11 is reflected at a point 12 to a point 13 on the major axis 8 of the oval of revolution. This ray radiating from the point 14 on the major axis 8 near an outside end of source is directed to a conjugate point near the outside end of the laser.

Similarly, the ray 17 radiated from the source of radiation 5 reflects on the plane 7 at the intersection of the plane 7 and the reflector 1. The ray 17 is reflected to the point 22 which is a point on the major axis 8. Accordingly, it is seen that rays radiating from a point on the axis are directed after reflection by the oval of revolution back through the major axis 8 toward some point near the conjugate image point.

An ellipsoid of revolution reflector which is a special case of the reflectors under consideration, having a source of radiation at the first focal point will concentrate the radiation at the second focal point by the reflection of all rays by the curvature of the reflector surface. The rays radiating from the first focal point and reflected to the second focal point are not illustrated in this drawing as this phenomenon is understood.

The source of radiation 5 is a cylindrical element whereby points on or within the source radiate in all directions. For the purpose of illustration, an arbitrary point 18 toward the center of the oval and within the source was also selected. The ray 19 from point 18 is reflected by a point on the reflector 1 where the plane 7 intersects the oval of revolution. The ray 19 is reflected to a point 20 on the major axis which is also nearer the center of the oval than point 22. Likewise, a ray 21 is reflected by the reflector 1 at the intersection of the plane 6 and is reflected to the point 32 near but not exactly at point 20. The point 32 is also on the axis of revolution 8.

From this description it can be seen that all rays radiated from points on the major axis of the oval of revolution will be reflected by the reflecting surface of the reflector 1 back to the major axis 8 of the oval of revolution. The reflection concentrates the radiated energy into a cylinder lying along the major axis of the reflector. The laser is located in this position to receive the maximum energy concentration. The light entering the laser 4 raises the energy state in the laser. The reflector provides a means for a high transmission of energy from the radiant source to the laser.

A laser responds to a specific wave length band of light. For optimum conditions, it is desirable to radiate a radiant flux in this specific wave length region. For this reason, the source of radiation should radiate energy in this area of the spectrum.

To concentrate energy transferred to the laser the reflector also is reflectant to the wave lengths of light utilized by the laser. The reflector 1 may have a light-absorbing characteristic whereby only the wave lengths of light acceptable by the laser 4 are reflected to the laser. The rest of the energy in the radiant flux would be absorbed in the reflector 1 and not add to the heating of the laser.

A modified means of accomplishing a similar result would be to have a reflector 1 reflecting only the light of the wave length used to build up the energy level in the laser and transmitting all other wave lengths through the reflector. Either type would provide maximum efficiency in energizing the laser without unproductive heating.

The reflector reflects practically all of the radiant flux of the desired wave lengths which is radiated by the source of radiation. The reflected flux is directed to the major axis 8 of the oval of revolution. In other words, any light radiated from the radiant source 5 is reflected in the same plane as it is radiated, and this average plane in which the light is radiated and reflected includes the major axis 8. It is not feasible to place a radiant source at an infinitely small point, such as the focal point of an ellipsoid of revolution. This device locates the source of radiation coincidental with the major axis 8 of the ellipsoid or oval. The result is substantially the same as if the source of radiation were concentrated at the focal point of an ellipsoid. It is understood that the laser is not an infinitely small point which might be located at the conjugate focal point of an ellipsoid. All of the light which is radiated from the tubular source of radiation is directed to the optically conjugate image position which lies along and near the major axis 8. By placing the laser at the optically conjugate image position and in line with this image, a very high efficiency would be achieved in energy transmission from the source of radiation to the laser.

The above description and drawings illustrate the preferred embodiment of this invention. Other modifications might be described which would fall within the spirit of the invention. The following attached claims, however, cover the invention as set forth in this application.

What is claimed is:

1. In a device of the character described comprising in combination, a reflector defining at least a segment of an ellipsoid of revolution with the major axis as the axis of revolution and a first and second focus lying on said axis, a substantially linear source of radiation located at the first focus and having a longitudinal axis coincidental with the major axis of the ellipsoid, a laser element having an axis located at the second focus of the ellipsoid and coincidental with the axis of the source of radiation, said reflector reflecting radiation incident on said reflector to said laser element thereby providing maximum energy transmission from said radiant source to said laser element.

2. In a device of the character described comprising in combination, a reflector defining an oval of revolution with the major axis being the axis of revolution, a source of radiation having an axis located on and coincidental with a linear portion of the major axis of the oval, an elongated laser element having a longitudinal axis located on and coincidental with a linear portion of the major axis of the oval and conjugate to the source, said reflector directing radiation incident upon the surface of said reflector to said laser element and thereby providing maximum energy transmission from said radiant source to said laser element.

3. In a device of the character described comprising in combination, a reflector defining at least a segment of an oval of revolution and the major axis as the axis of revolution, an elongated source of radiation located longitudinally on the major axis of the oval, an elongated laser element located conjugate to the source and longitudinally on the major axis, the reflecting surface of said reflector thereby reflecting radiant energy leaving said radiant source to said laser element to provide maximum energy transmission.

4. In a device of the character described comprising in combination, a reflector defining at least a segment of an ellipsoid of revolution wherein the major axis is the axis of revolution and it intersects a first and a second focus, a substantially cylindrical shaped radiation source enclosing the first focus of said ellipsoid and having a longitudinal axis substantially coincidental with the major axis of the ellipsoid, a laser element enclosing the conjugate focus and having an axis lying substantially coincidental with the major axis of the ellipsoid, said reflector reflecting a radiant flux from said radiation source to said laser element to provide maximum energy transmission.

5. In a device of the character described comprising a reflector defining at least a segment of an oval of revolution having the axis of revolution being the major axis and having a first and second focus on said axis, an elongated radiation source enclosing said first focus having a longitudinal axis lying substantially coincidental with the major axis of said oval, a laser element enclosing said second focus having an axis lying substantially coincidental with the major axis of said oval of revolution and conjugate to the radiation source, means defining at least one opening in said reflector on the major axis for projecting radiation from said laser element through the opening, said reflector thereby reflecting the radiant energy from said radiation source to the laser element to provide maximum energy transmission from the radiation source to the laser element.

6. In a device of the character described comprising in combination, a reflector defining at least a segment of an oval of revolution having the axis of revolution as the major axis and a first and a second focus, a substantially monochromatic reflecting surface forming said reflector, a substantially linear source of radiation having a longitudinal axis coaxially located at the first focus on the major axis of the oval, a laser element having an axis located coaxially at the second focus on a linear portion of the major axis of the oval and conjugate to said source, said reflecting surface reflecting radiation incident upon said surface to said laser element and thereby providing maximum useful energy transmission from said radiant source to said laser element.

7. In a device of the character described comprising in combination, a reflector defining at least a segment of an oval of revolution with the axis of revolution being the major axis and including a first and second focus, a substantially monochromatic reflecting surface providing transmission of unwanted wavelengths forming said reflector, an elongated source of radiation having an axis located at the first focus and coincidental with a linear portion of the major axis of the oval, an elongated laser element having a longitudinal axis located at the second focus conjugate to the source and coincidental with a linear portion of the major axis of the oval, said reflecting surface of said reflector thereby reflecting substantially monochromatic radiation to said laser element to provide maximum useful energy transmission.

References Cited by the Examiner

UNITED STATES PATENTS 1,278,026   9/1918   Salto _____ 219—34.11
2,543,053   2/1951   Parker _____ 219—34.11

OTHER REFERENCES

Ciftan et al.: "A Ruby Laser With an Elliptic Configuration," Proceedings IRE, vol. 49, No. 5, May 1961, pages 960 and 961.

Kaiser et al.: "Fluorescence and Optical Maser Effects in $CaF_2:SM^{+z}$," Phys. Review, volume 123, No. 3, August 1, 1961, pages 771 and 772 relied on.

JEWELL H. PEDERSEN, *Primary Examiner*.